Dec. 18, 1962 L. REID 3,069,117
AIRCRAFT ADAPTED FOR VERTICAL TAKE-OFF AND LANDING
Filed Feb. 20, 1962
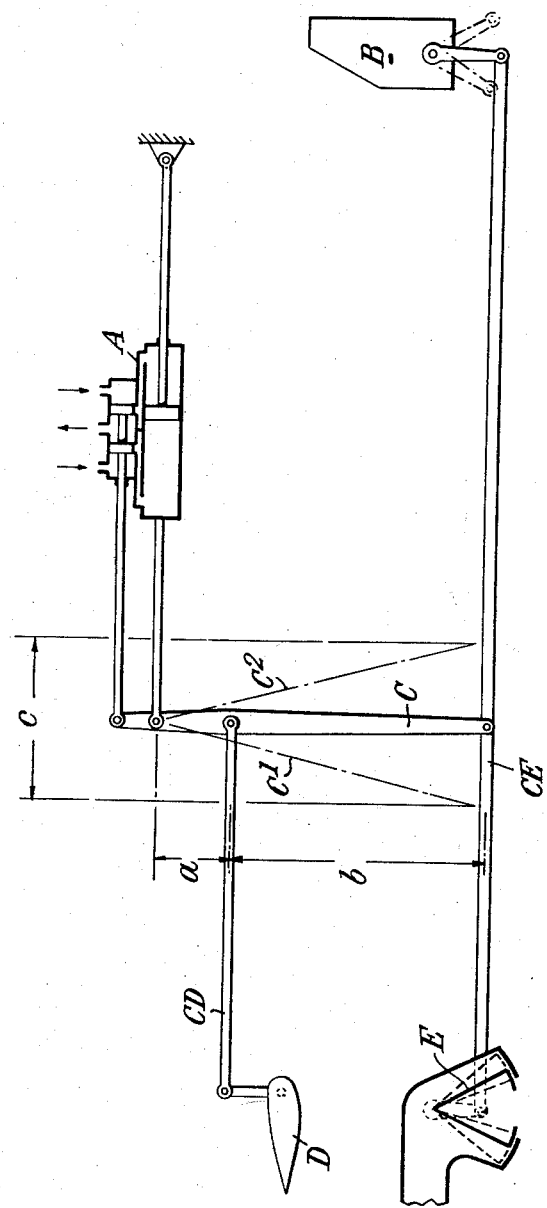
Inventor
Lawrence Reid
By Cushman, Darby & Cushman
Attorneys United States Patent Office 3,069,117
Patented Dec. 18, 1962

3,069,117
AIRCRAFT ADAPTED FOR VERTICAL TAKE-OFF AND LANDING
Lawrence Reid, Willoburn, Ballyvester, Donaghadee, County Down, Northern Ireland, assignor to Short Brothers & Harland Limited, Belfast, Northern Ireland, a British company
Filed Feb. 20, 1962, Ser. No. 174,544
Claims priority, application Great Britain Mar. 2, 1961
2 Claims. (Cl. 244—75)

The invention is concerned with aircraft adapted for vertical take-off and landing, said aircraft being of the type in which two separate means of stabilization and control are provided, one employing adjustable jet nozzles by which gases are expelled to provide appropriately directed thrust forces in hovering conditions where the aircraft has insufficient forward speed for the effective use of the aerodynamic control surfaces which constitute the second such means. The object of the invention is to provide improved apparatus whereby both the aforementioned systems may be operated conjunctively by automatic stabilizing apparatus, in such manner as to obtain maximum economy in the expenditure of jet nozzle power by making the greatest possible use of the aerodynamic control system, having regard to the fact that the overall gain increases with increase of forward speed, whilst the stabilizer response characteristics required for adequate control in hovering conditions may lead to instability due to increase in gain over even a restricted range of forward speed.

The apparatus proposed by this invention comprises a compound servo control system including a high-rate servo-motor and a low-rate servo-motor separately coupled to a differential lever which is itself separately connected to the aerodynamic control organ system and to the control jet nozzle system, the arrangement of said connections being such that the motion of said lever which is transmitted to the aerodynamic control organ system is the algebraic sum of the outputs of both servo-motors, the extent of motion of said aerodynamic control organ system which is attributable to the high-rate servo-motor being limited to a fraction of the total output of the latter whilst the jet nozzle system is responsive to the full output of the high-rate servo-motor.

It is found that such apparatus enables stability of the aircraft to be maintained over a wide speed range, and also ensures adequate handling characteristics throughout this range.

The manner in which the invention may be carried into effect is hereinafter more fully described with reference to the diagrammatic illustration of one form of apparatus constructed according to the invention which is contained in the accompanying drawing.

The aircraft to which the apparatus is applied, being one which is adapted for vertical take-off and landing, is provided with two mutually alternative stabilization and control systems. That is to say, there is a system employing adjustable jet nozzles by which an appropriately directed thrust force may be obtained by jet expulsion of gases during take-off and landing or whenever the aircraft has insufficient airspeed for the use of the conventional aerodynamic control organs which constitute the second system and which become effective as airspeed increases. One of the nozzles of the first system is indicated by the reference letter E, and a control surface of the second system is indicated at D.

The apparatus provided in accordance with the invention comprises a high-rate automatic stabilizer servo-motor actuator B and a low-rate servo-motor actuator A which are respectively connected to opposite ends of a differential lever C which is connected by the link CD to said aerodynamic control organ D so that the effective lengths of the arms by which said control organ D is operated by the actuators A and B are respectively equivalent to the dimensions $a$ and $b$. The lever C is also connected to said jet nozzle E by a connection CE such that the latter receives the full output of the actuator B, the extent of which is equivalent to the dimension $c$.

Transient control movements due to the actuator A are equal to a fraction $b/a$ of the movements of the actuator B. The actuator A operates when the lever C occupies an oblique position, represented e.g. by one of the dotted lines $C^1$ or $C^2$, following up the movement of the actuator B and returning the lever C to the non-oblique position in which it is shown in the drawing.

In hover conditions (i.e. when the aircraft has zero forward speed), the control power required to stabilize and manoeuver the aircraft is supplied entirely by the control nozzles E and must have a certain minimum value and rate of application if satisfactory stability is to be attained. The phase lag and amplitude ratio (gain) characteristics of the jet nozzle movements, with respect to the pilot's control input or stabilizer gyroscope input, will be such that the amplitude ratio will either remain constant or increase up to a certain frequency while the phase lag increases.

As the control power increases with forward speed of the aircraft, a greater moment is applied for a given stabilizer gyro input, i.e. aircraft displacement, so that the natural frequency of the system increases. This, in conjunction with the amplitude response and phase lag of the stabilizer, can cause unstable oscillations to occur at some speeds. The speed at which instability occurs is however increased by gearing the aerodynamic controls as described.

What I claim as my invention and desire to secure by Letters Patent is:

1. In or for aircraft adapted for vertical take-off and landing, of the type referred to, apparatus comprising a compound servo control system including a high-rate servo-motor actuator and a low-rate servo-motor actuator separately coupled to a differential lever which is itself separately connected to the aerodynamic control organ system and to the control jet nozzle system, the arrangement of said connections being such that the motion of said lever which is transmitted to the aerodynamic control organ system is the algebraic sum of the outputs of both servo-motors, the extent of motion of said aerodynamic control organ system which is attributable to the high-rate servo-motor being limited to a fraction of the total output of the latter, whilst the jet nozzle system is responsive to the full output of the high-rate servo-motor actuator.

2. Apparatus defined in claim 1 said connection including a first link connecting said lever to the jet nozzle control system wherein said latter system receives the full movement of the high-rate servo-motor actuator and a second link connecting said lever to said aerodynamic control organ wherein the effective length of the arms operating said aerodynamic control organ by both of said actuators are in a ratio of a fraction substantially less than one.

No references cited.